United States Patent [19]
Rutz

[11] Patent Number: 5,402,556
[45] Date of Patent: Apr. 4, 1995

[54] TENTERING FRAME WITH A TENTERING CHAIN FOR TREATING FILM WEBS SIMULTANEOUSLY IN TWO AXIAL DIRECTIONS

[75] Inventor: Andreas Rutz, Lindau, Germany

[73] Assignee: Lindauer Dornier GmbH, Lindau, Germany

[21] Appl. No.: 163,116

[22] Filed: Dec. 7, 1993

[30] Foreign Application Priority Data

Dec. 8, 1992 [DE] Germany .................. 42 41 213.7

[51] Int. Cl.⁶ ............................................. D06C 3/02
[52] U.S. Cl. ............................................. 26/73; 26/93
[58] Field of Search ............... 26/72, 73, 87, 88, 89, 26/93, 94; 264/289.6, 290.2

[56] References Cited

U.S. PATENT DOCUMENTS

| | | | |
|---|---|---|---|
| 4,637,103 | 1/1987 | Hutzenlaub | 26/73 |
| 4,807,336 | 2/1989 | Yoshimura et al. | 26/73 |
| 4,890,365 | 1/1990 | Langer | 26/73 |
| 5,081,750 | 1/1992 | Molz | 26/73 |
| 5,084,949 | 2/1992 | Rutz et al. | 26/72 |
| 5,101,965 | 4/1992 | Rutz et al. | 26/93 |
| 5,161,674 | 11/1992 | Rutz et al. | 198/812 |
| 5,265,313 | 11/1993 | Rutz | 26/73 |

FOREIGN PATENT DOCUMENTS 0291775 11/1988 European Pat. Off. .

Primary Examiner—Clifford D. Crowder
Assistant Examiner—Amy B. Vanatta
Attorney, Agent, or Firm—W. G. Fasse; W. F. Fasse

[57] ABSTRACT

A tentering frame is equipped with a tentering chain for the simultaneous treatment of a film web in two directions or in a so-called biaxial manner. The film web is carried by endless tentering chains which hold the film web edges by grippers carried by tentering clamps secured to the tentering chain. The chains have tiltable chain link plates and chain links, whereby the on-center spacing between neighboring clamps is continuously adjustable or variable for changing the chain pitch. In order to reduce the normal pitch when the chain is stretched out as much as possible, and in order to achieve a more efficient pitch adjustment in a larger adjustment range, each tentering clamp is carried by a single shaft which simultaneously functions as one of the two chain pins or chain axles that link two neighboring chain links to each other. One of the chain link plates, either the inner or the outer chain link plate, is formed as an angled bellcrank type of lever carrying control rollers which cooperate with respective control rails for the continuous variation of the chain pitch.

12 Claims, 7 Drawing Sheets

TENTERING FRAME WITH A TENTERING CHAIN FOR TREATING FILM WEBS SIMULTANEOUSLY IN TWO AXIAL DIRECTIONS

FIELD OF THE INVENTION

The invention relates to a tentering frame for treating film webs simultaneously in two axial directions. The film webs are, for example, stretched in one direction and simultaneously subjected to shrinking in a direction extending perpendicularly to the first mentioned direction.

BACKGROUND INFORMATION

Tentering frames for the stated purpose include tentering chains and at least one guide rail that supports and guides the respective tentering chain along its endless path. Each tentering chain is equipped with tentering clamps having grippers for gripping the margin or edge of a film web. The tentering clamps are carried by chain links interconnected to form the tentering chain. Each clamp is provided with guide elements, for example, guide rollers that travel along the guide rail. The spacing between two neighboring tentering clamps is continuously adjustable for varying the pitch that corresponds to the just mentioned spacing.

The continuous pitch variation may, for example, be accomplished by kinking neighboring chain links relative to each other so that they deviate from a straight line. European Patent Publication EP 0,291,775 A2 corresponding to U.S. Pat. No. 4,890,365 (Langer) issued on Jan. 2, 1990, discloses an apparatus for treating film webs simultaneously in two axial directions. The pitch or mutual spacing between neighboring tentering clamps in the tentering chain according to Langer is continuously variable. For this purpose, the tentering chain is equipped with so-called kinking chain links which in their stretched-out condition travel substantially along a straight line in a common plane. However, when the chain links are kinked, they do not travel any more in a common plane. Rather, the chain links then form a zig-zag configuration.

In the Langer disclosure it is necessary that an intermediate chain link is inserted between neighboring tentering clamps so that a deflection of the chain links between neighboring clamps becomes possible at all. The intermediate chain link articulates neighboring kinking chain links to each other, whereby the kinking becomes possible. The known tentering chain is so constructed that the forces necessary for varying the pitch between neighboring tentering clamps are effective on the tentering clamps and must be transmitted through the intermediate chain link into the guide mechanism of the tentering clamp. Since the tentering clamp itself forms a rigid portion of the tentering chain and since the tentering clamp itself is also rigid, the adjustment of the pitch can only be accomplished through the intermediate chain link arranged between neighboring clamps. This features permits relatively small pitch variations because an adjustment of the tentering clamps relative to each other is achieved only by a relative small deflection of the intermediate chain link that articulates two neighboring tentering clamps to each other. This limitation is due to the fact that the journal axis of two neighboring tentering clamps is not located in a clamp body itself, but rather in a journal joint outside of a tentering clamp body.

As a result, the on-center spacing between neighboring tentering clamp bodies is relatively large so that the corresponding pitch is also relatively large and any variation of the large pitch is relatively small, which is not desirable. Thus, there is room for improvement.

OBJECTS OF THE INVENTION

In view of the foregoing it is the aim of the invention to achieve the following objects singly or in combination:

to construct a tentering chain with its tentering clamps in such a way that the adjustment forces needed for continuously varying the pitch do not pass through the clamp guide mechanism nor directly through the clamp bodies;

to relieve the guide mechanism and the guide rails of the adjustment forces so that the guide mechanism including the bearings for the guide rollers, especially the rear guide rollers and the guide rail or rails themselves can have smaller dimensions;

to construct the individual tentering clamps so that the journal axis of a linkage mechanism that transmits the adjustment forces for varying the pitch between neighboring tentering clamps is located within the tentering clamp body;

to make sure that the rolling section of each tentering clamp is by-passed by any force flow of the adjustment forces;

to reduce the number of journal or pivoting points for the chain links of each tentering clamp;

to avoid the need for an intermediate chain link between neighboring tentering clamps;

to reduce the overall pitch length while simultaneously increasing the range of variability of the pitch; and to simplify the motion that is necessary for varying the pitch.

SUMMARY OF THE INVENTION

A tentering chain according to the invention comprises a plurality of tentering clamps, each of which has a clamp body through which a single shaft extends which also functions as a chain link pin. At least two chain link plates are secured or pivoted to the single shaft, so that the shaft is simultaneously a chain link pin for these link plates. At least one of the link plates comprises or is formed as an angled adjustment bellcrank lever having a first free end and a second end. A first adjustment roller is rotatably mounted to the free end of the angled adjustment lever for rolling along a first control rail. A second adjustment roller is arranged or mounted at the second end of the at least one angled adjustment lever for rolling along a second control rail. Both control rails do not form part of the tentering chainbut are part of the system that includes the tentering chain or chains, the control rails, and guide rails.

A chain link pin interconnects the at least two chain link plates and the second adjustment roller is rotatably secured to one end of the chain link pin. A chain link including two bushings is arranged between the two link plates in such a manner that the single shaft passes through one of the bushing's while the chain link pin passes through the other of the bushings.

It is an important feature of the invention that an intermediate chain link between two neighboring tentering clamps has been avoided. As a result, the journal axis for such an intermediate chain link is also obviated. By using the single shaft that passes through the body of the tentering clamp as a journal shaft, two neighboring tentering clamps have been brought closer to each other whereby the respective journal axis no longer is located outside the tentering clamp body. Rather, the journal axis is located in a central area of the tentering clamp body, whereby it now becomes possible to journal neighboring tentering clamps to each other with a smaller intermediate spacing and the conventional intermediate chain link has been avoided. As a result, the pitch has also been shortened, which is an important advantage of the invention.

Another important advantage of the invention is seen in the fact that a larger adjustment range, compared to the prior art, has been achieved because with the smaller pitch a certain adjustment distance of the linkage mechanism according to the invention achieves a larger relative variation of the pitch even if that adjustment distance is the same as in the prior art.

Another important advantage of the invention is seen in that the adjustment motion for varying the pitch no longer needs to be taken up through the guide system of the tentering clamps. Rather, the adjustment motion is now effective directly on the chain link plates. This feature of the invention has the advantage that the guide rail which is constructed as a package of spring tapes or leaves, can have a relatively smaller dimension. Similarly the guide and support rollers which travel along the guide rail or rails can have relatively smaller bearings because these bearings now do not have to take up any adjustment forces in addition to the guide and support forces. These bearings thus need to take up only the bearing forces that are effective due to the guiding of the tentering clamp body along the guide rail or rails.

The adjustment drive for varying the chain pitch is effective as a spreading motion applying two oppositely directed forces between a chain link and one of the chain link plates, for example, the outer chain link plate or the inner chain link plate.

Another important advantage of the invention is seen in that the spreading motion for adjusting the chain pitch is caused in a relatively simple manner, for example, by a spreader drive, such as a spindle that cooperates with a spindle nut having a right-hand threading at one end and a left-hand threading at the opposite end. The threadings are axially aligned with each other and receive respectively threaded spindles which move toward each other or away from each other for applying the respective adjustment force. The outer ends of the threaded bolts are connected to the above mentioned control rails for the continuous pitch adjustment.

Instead of a spindle drive, an eccentric cam could be arranged between two control rails which can be spaced from each other by rotating the eccentric cam, more or less to provide the required pitch adjustment motion. The ecenter bears against the respective control rails, thereby displacing the control rails in a direction perpendicularly to the chain advance direction. The control rails are sufficiently flexible.

Due to the above features of the invention the advantage is achieved that the force for adjusting the pitch no longer must be taken up directly by the tentering clamp. Rather, the adjustment forces are taken up by the chain links.

Further, each tentering clamp according to the invention is only connected to the chain with the aid of the single shaft which was not the case in the prior art where the tentering clamp body was connected to the chain through two shafts or axles, whereby the force flow of the adjustment forces had to pass through the tentering clamp body requiring a respectively dimensioned tentering clamp body. The invention avoids over-dimensioned tentering clamp bodies, whereby the entire tentering chain becomes lighter. Yet another advantage of the invention is seen in that a given adjustment distance applied to the tentering chain according to the invention and to a conventional tentering chain achieves a 30% increase in the pitch adjustment range compared to the prior art.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
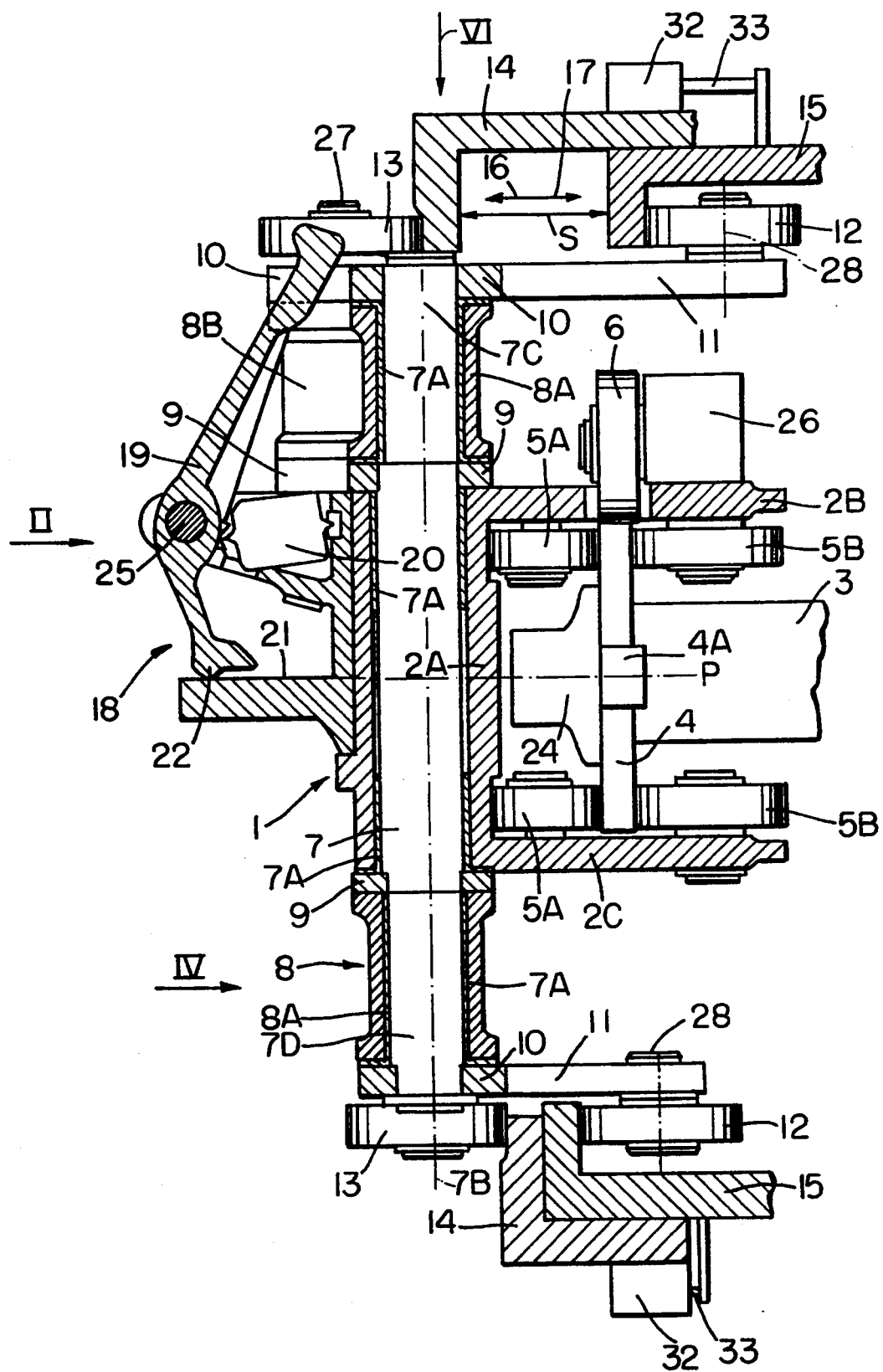
FIG. 1 is an axial sectional view through a tentering clamp according to the invention with the section extending perpendicularly to the length of the tentering chain and along line I—I in FIG. 2, whereby the upper portion of FIG. 1 shows a deflected position with a reduced pitch while the lower portion shows the normal position with a straight tentering chain having its maximum pitch.
Figure 2:
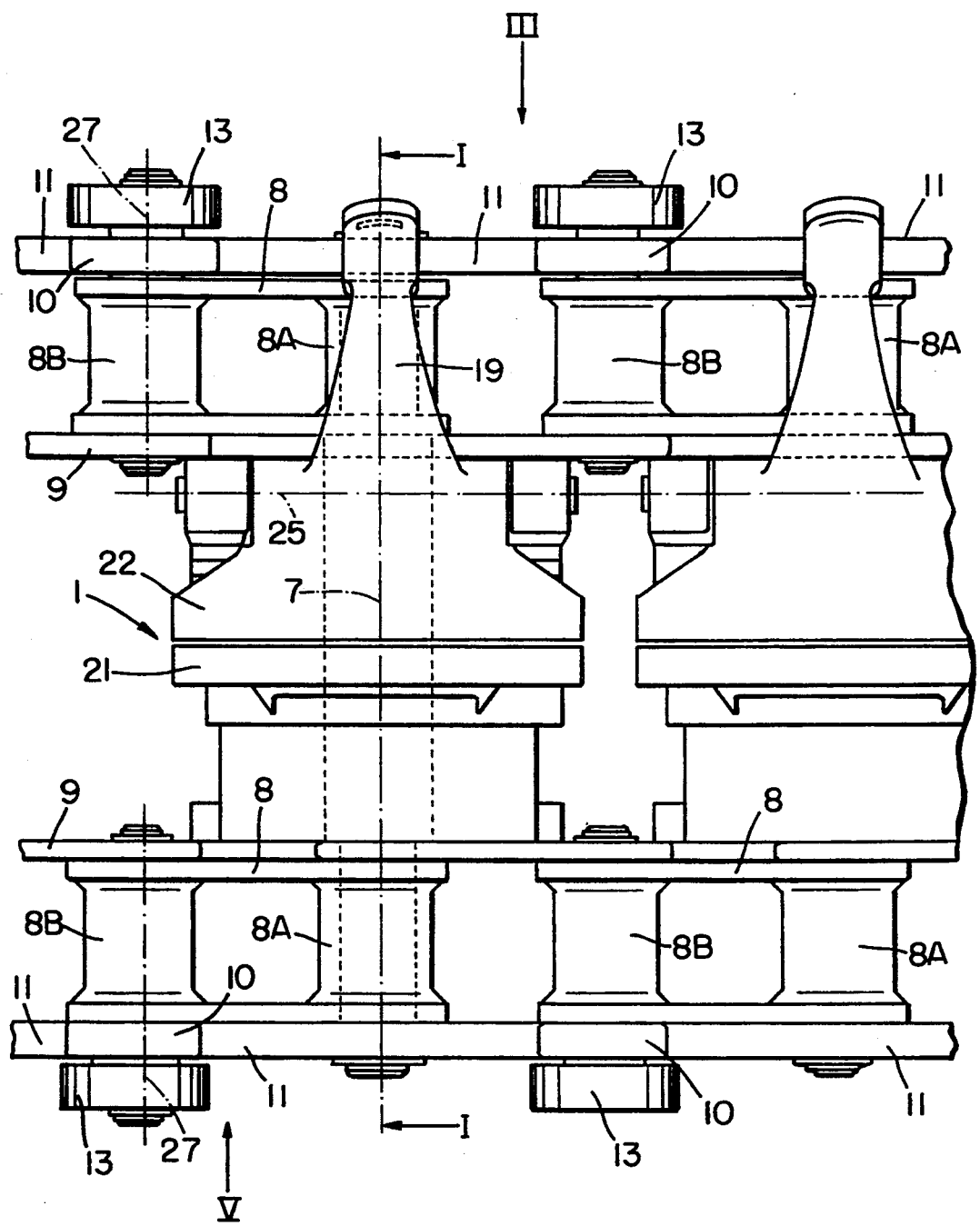
FIG. 2 is a view in the direction of the arrow II in FIG. 1.

Referring to FIGS. 1 and 2, all tentering clamps have the same construction and include a clamp body 1 having a vertically extending body portion 2A and two horizontally extending leg sections 2b and 2C. The body portion 2A has a central bore 2D through which a single shaft 7 extends which also functions as a chain link pin to be described in more detail below. Preferably, the single shaft 7 passes through antifriction sleeves 7A. Thus, the clamp body is rotatable about the longitudinal axis 7B of the single shaft 7. Two inner chain link plates 9 are rigidly secured to the single shaft 7 so that these link plates 9 rotate with the shaft 7.

Incidentally, the construction of the tentering clamp above the central horizontal plane P is substantially mirror-symmetrical to its construction below the plane P so that the description of the upper part applies as well to the lower part of the tentering clamp.

The single shaft 7 has an upper axle stub 7C and a lower axle stub 7D. Each of these stubs carries a chain link 8 with a first link bushing 8A and a second link bushing 8B. The link bushings 8A are rotatably mounted on the respective axle stub 7C, 7D, preferably with a friction reducing sleeve 7A. The outer end of each axle stub is rigidly connected to outer chain link plates 10. These outer chain link plates 10 are constructed as angled plates that function as a control lever 11 having a free end to which a control roller 12 is rotatably mounted for rotation about an axle 28. The control rollers 12 cooperate with a first inner control rail 15 which is mounted in such a way that it is displaceable in the direction of arrows 16, 17 relative to a second outer control rail 14. A further control roller 13 rotatably mounted to an axle 27 bears against the second control rail 14. As best seen in FIG. 2, the axle 27 passes through the inner chain link plate 9, through the bushing 8B of the chain link 8, and through the outer chain link plate 10. Further, the control roller 13 is rotatably mounted to the outer end of the axle 27. The control rails 14, 15 guide each other.

A gripper section 18 is operatively mounted to the tentering clamp body 1 as shown on the left-hand side of FIG. 1. The gripper section comprises a table 21, a gripper lever 19 journalled to a journal 25. The gripper lever 19 forms a see-saw lever with an extension forming a gripper head 22 bearing against the table 21 for gripping a film edge. The gripper lever 19 is moved clockwise about the journal 25 to open the gripper head 22 or counterclockwise to close the gripper head 22. A spring 20 is so arranged that it biases the tentering clamp either into the open or into the closed position. The mechanism for opening and closing the clamp head 22 is conventional and hence not shown.

The guide mechanism for guiding the present tentering clamps along a guiding and supporting rail 4 mounted to the machine frame 3, by a mounting member 4A and a pressure rod 24, is housed inside the space between the leg sections 2B and 2C of the tentering clamp body 1. The guide rail 4 comprises a plurality of band or leaf spring elements formed as a package to make the guide rail 4 relatively flexible yet sufficiently rigid for the guiding and supporting. The guide mechanism comprises, for example, four guide rollers 5 forming two pairs of guide rollers 5A and 5B. The upper pair of guide rollers 5A and 5B are rotatably mounted to axles rigidly secured to the upper leg section 2B. The lower guide roller pair 5A, 5B is rotatably mounted to respective axles rigidly secured to the lower leg section 2C. A support roller 6 is rotatably mounted to a support block 26 which in turn is rigidly secured to the upper leg section 2B. The rollers 6 ride on the upwardly facing flat surface of the support and guide rail 4. Each tentering clamp 1 is guided by eight guide rollers 5 only four of which are shown in FIG. 1. The other set of four guide rollers is positioned in front of the drawing plane of FIG. 1. The weight of the tentering chain is introduced into the machine frame 3 through the rollers 6 riding on the guide and support rail 4.

Referring further to FIG. 1, the upper control rails 14 and 15 are shown spaced from each other by a spacing S, whereby the chain link bushing 8B is kinked outwardly and hence visible in the upper section of FIG. 1. The spacing S is adjustable, for example, by a piston cylinder device 32 having a piston rod 33. The device is so connected that the two control rails 14 and 15 which are sufficiently flexible for this purpose, can be moved apart as shown at the top of FIG. 1, or moved together as shown at the bottom of FIG. 1. Further control drive means will be described below with reference to FIGS. 7 and 8.

Figure 4:
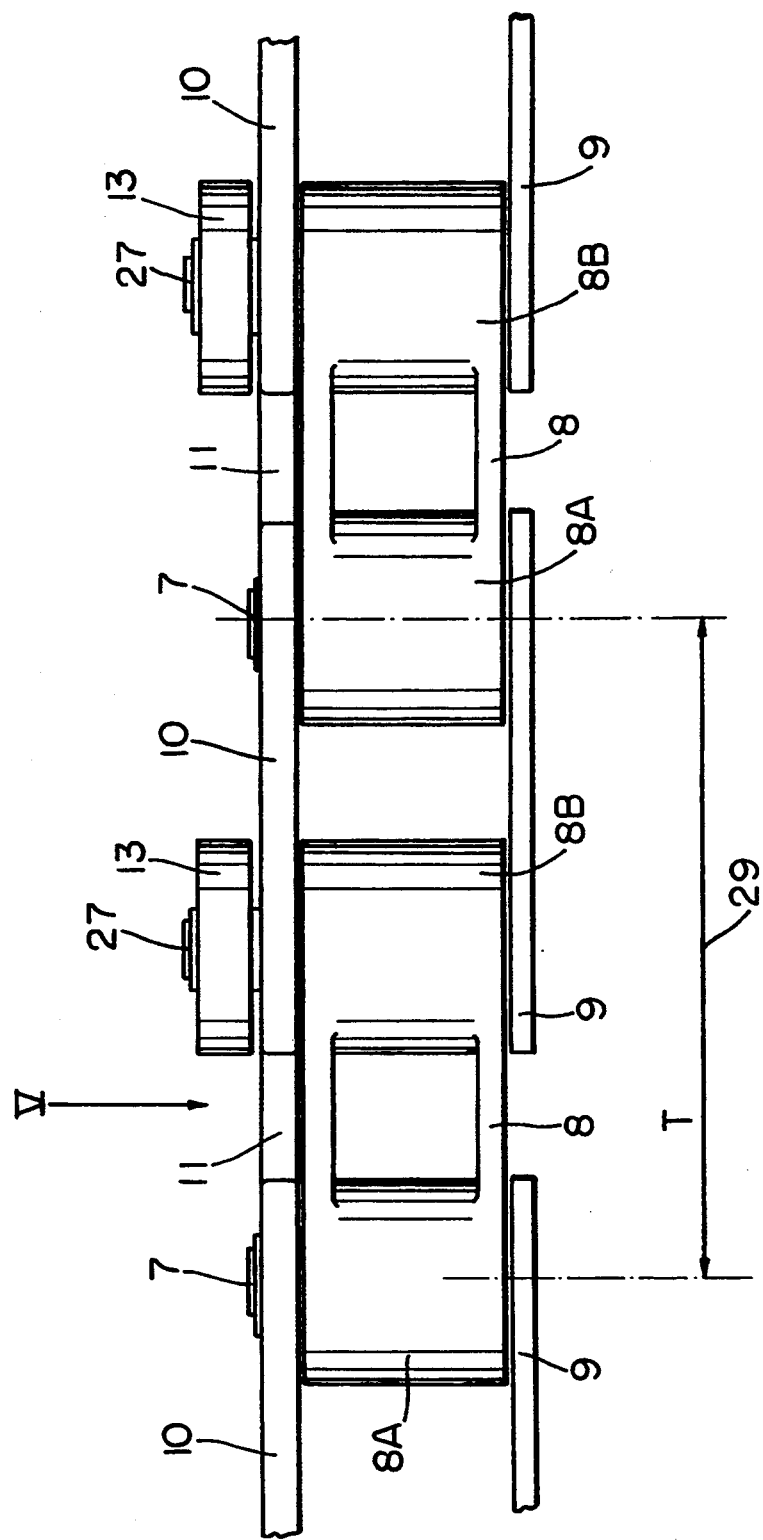
FIG. 4 is a side view in the direction of the arrow IV in FIG. 1.

Referring to FIG. 2, it will be noted that the shaft or axle 27 passes through the outer chain link plate 10 and through the lower chain link plate 9, whereby the outer plate 10 simultaneously functions as adjustment lever 11, and whereby a separate, journalled connecting element has been obviated according to the invention, because the tentering clamps are now directly integrated into a chain link by the single shaft 7 that forms with its outer stubs 7C and 7D a chain link pin which journals the chain link plates 9 and 10 to the chain link 8 at one end through the bushing 8A while the shaft or axle 27 journals the plates 9 and 10 to each other at the bushing 8B through which the axle 27 extends, whereby the maximum length pitch T, shown at 29 in FIG. 4, is achieved. The pitch T is also shown in FIG. 5 illustrating the chain in its stretched-out not kinked condition.

Figure 3:
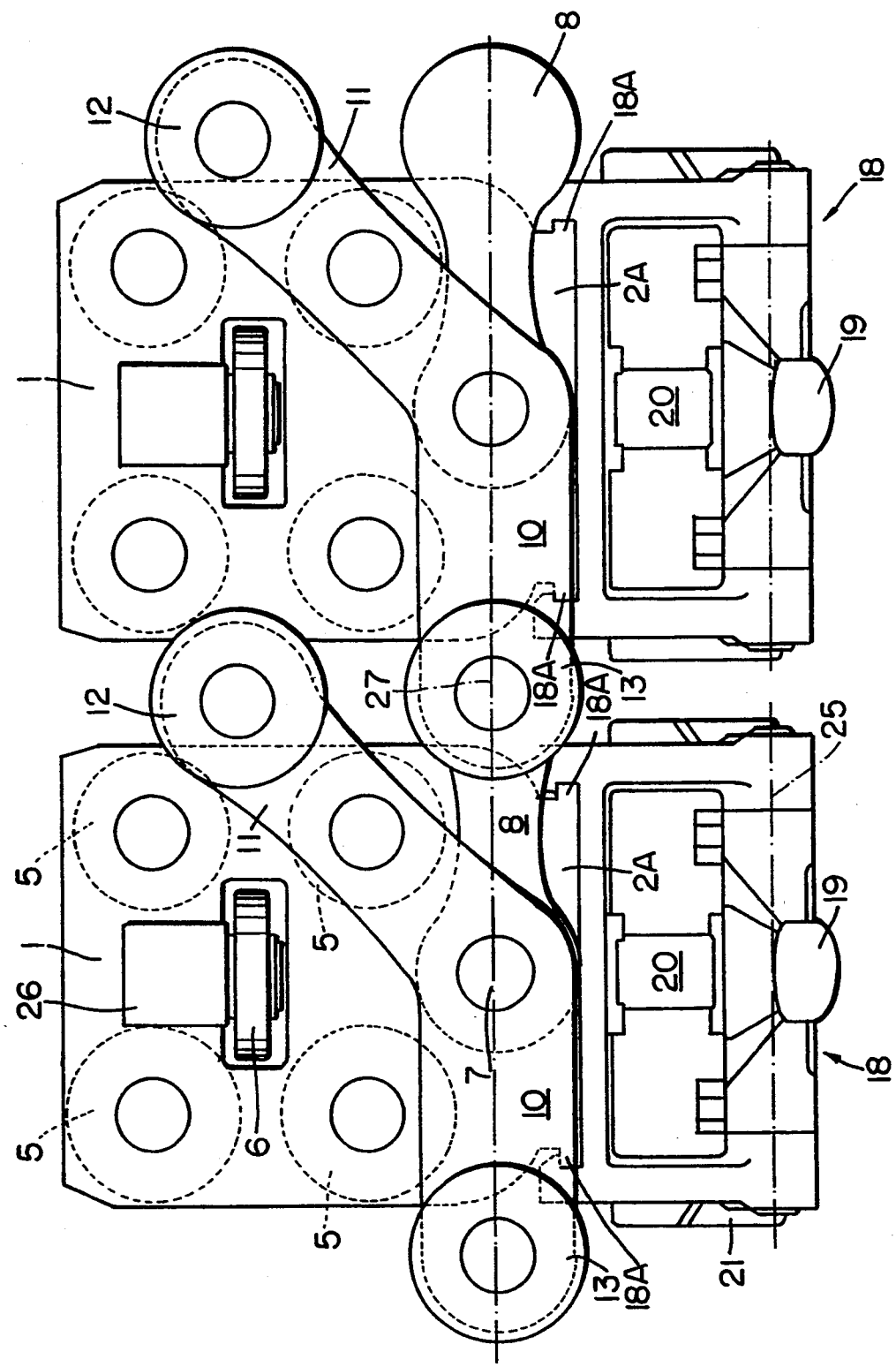
FIG. 3 is a top plan view in the direction of arrow III in FIG. 2.

FIG. 3 shows that the outer chain link plates 10 are constructed as angled levers with an extension 11 forming a bellcrank. This feature is also clearly visible in FIGS. 5 and 6.

Figure 5:
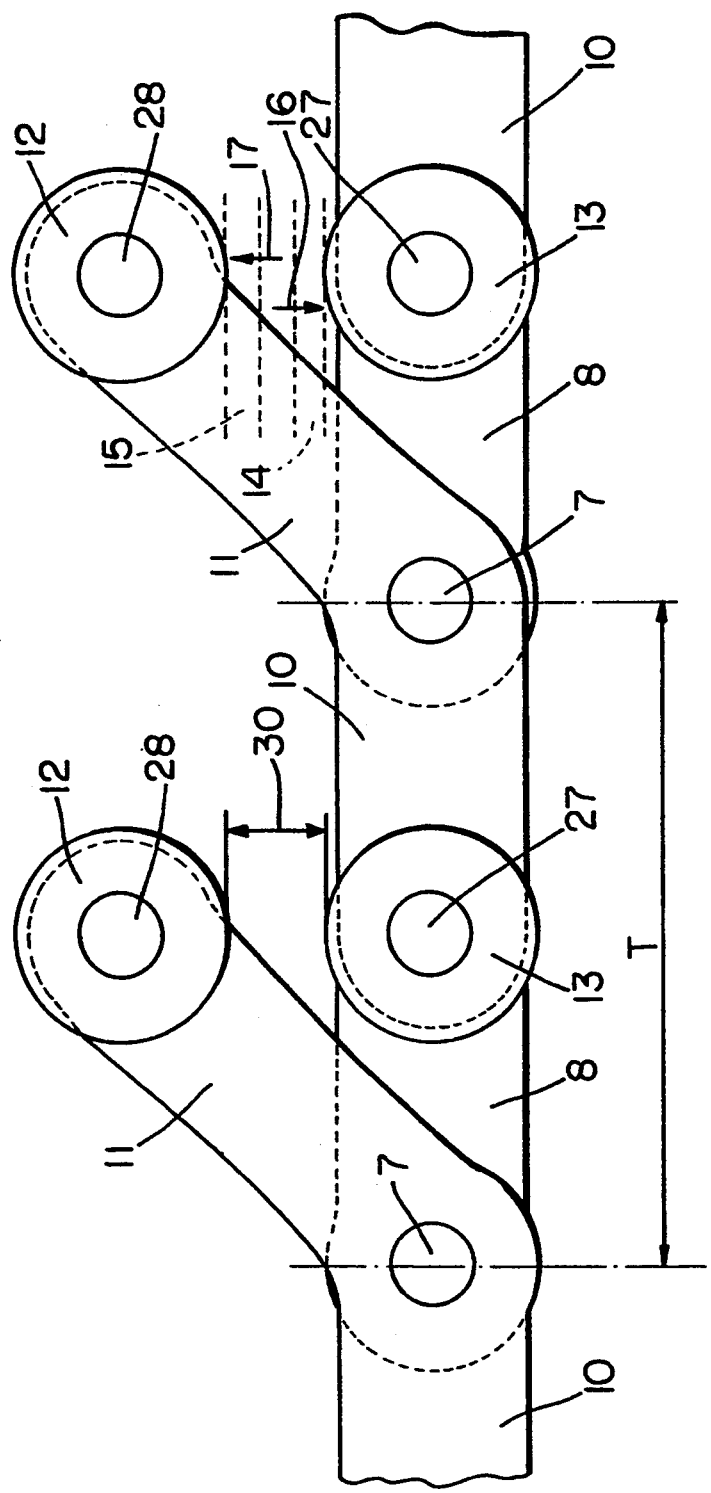
FIG. 5 is a view in the direction of the arrow 5 in FIG. 2 and in FIG. 4, illustrating the tentering chain in its straight, stretched-out condition without deflection of the angled chain link plates.
Figure 6:
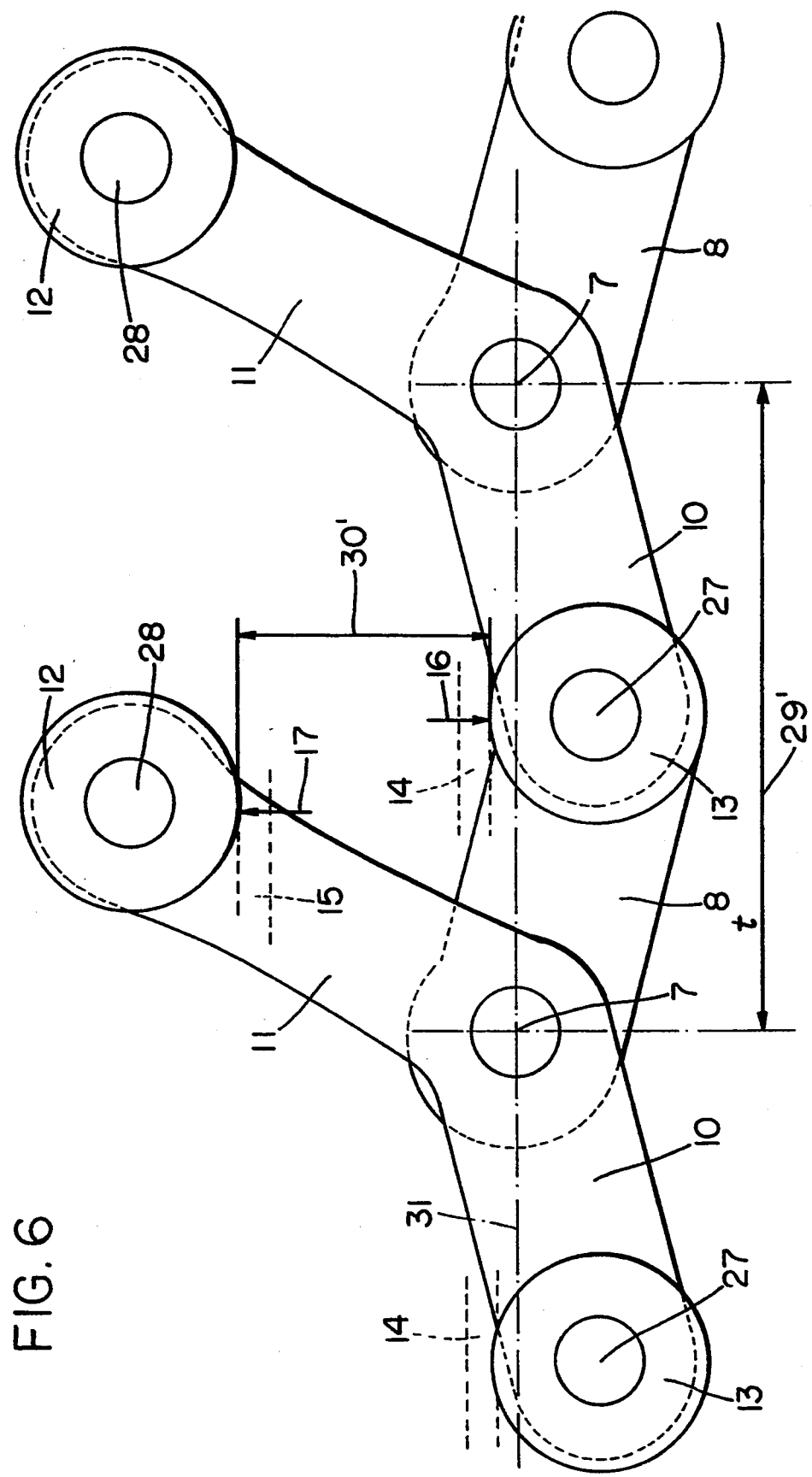
FIG. 6 is a view similar to that of FIG. 5, in the direction of the arrow VI in FIG. 1 and showing the deflected state of the angled chain link plates, thereby kinking or zig-zagging the tentering chain for a reduced pitch.

Referring to FIGS. 4, 5 to 8, the operation for adjusting the pitch T, t will now be described. The letter T illustrates the full length pitch when the chain is not kinked. The letter t illustrates the pitch when the chain is fully kinked as shown in FIG. 6.

FIGS. 4 and 5 show the chain in its straightened out, unkinked condition. In order to change the pitch T to the shorter pitch t, the control lever portions 11 of the link plates 10 are moved counterclockwise in FIG. 5 for establishing the spacing S between the control rails 14 and 15, whereby the applied spreading force is effective in the direction of the arrows 16 and 17 shown in FIG. 1.

Figure 7:
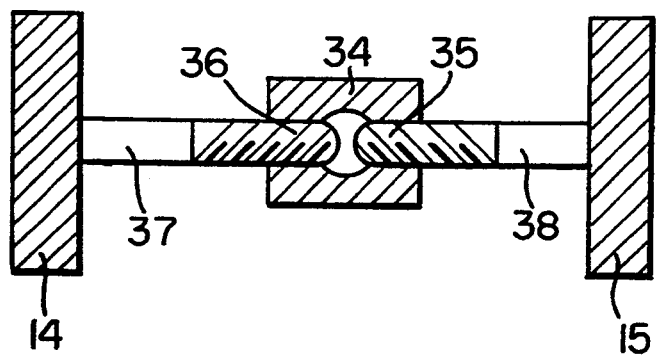
FIG. 7 illustrates a top plan view of a control device for adjusting the pitch with the aid of a threaded nut and two spindles.

In order to apply the spreading force, the above piston cylinder devices 32, 33 may be used. However, FIG. 7 shows a spreading device with a spindle nut 34 having a right-hand threading 35 at one end and a left-hand threading 36 at the other end. Adjustment spindles 37, 38 cooperate with respective threadings 35, 36 in the spindle nut 34. The opposite ends of the spindles 37, 38 are rotatably connected to the respective control rail 14 and 15. Rotation of the spindle nut 34 increases or decreases the spreading or spacing S between the control rails 14 and 15. The two adjustment rods or spindles 37, 38 are axially aligned with each other in the spindle nut 34.

FIG. 6 shows the spread-out condition, wherein the shortened pitch t with the length 29' is established by increasing the spacing 30 shown in FIG. 5 to the spacing 30 shown in FIG. 6. These spacings are measured between two parallel tangential lines to the two control rollers 12 and 13. It is to be noted that FIGS. 5 and 6 are not drawn to scale. The pitch distance 29' in FIG. 6 representing the pitch t is in fact shorter than the pitch distance 29 for the pitch T shown in FIGS. 4 and 5.

According to the invention the kinking reduces the respective pitch length efficiently because an intermediate chain link plate has been avoided. The single shaft 7 takes up the control forces so that the guide mechanism shown between the leg sections 2B and 2C in FIG. 1 of the tentering clamps is substantially free of the control forces applied for the pitch adjustment. Incidentally, in the drawings the outer chain link plate 10 has been shown as an angled lever forming substantially a bellcrank lever with an extension 11. However, the inner chain link plate 9 could be constructed as a bellcrank lever instead of the plate 10. In both instances the tilting action would take place about the single shaft 7 of the tentering clamp. All of these shafts of all tentering clamps along a chain remain in the same position, namely along the tension axis 31 of the tentering chain. The adjustment forces are thus introduced from the link plates 9, 10 into the links 8, thereby bypassing the tentering clamp body which thus does not participate in the force transmission and hence can be dimensioned substantially lighter than was possible heretofore. The plates 10 and 9 are directly connected between the single shaft 7 and the axle 27.

The invention achieves, with the features described above, the substantial advantage that the tentering clamp body only has to perform the proper transport and guiding of the gripper section 18 and of the chain made up of the chain links 8 and the link plates 9 and 10. The large bearings for the guide rollers 5 necessary heretofore, have thus been obviated. The same applies to the support rollers 6 which require now smaller bearings because the entire tentering chain has become lighter.

Figure 8:
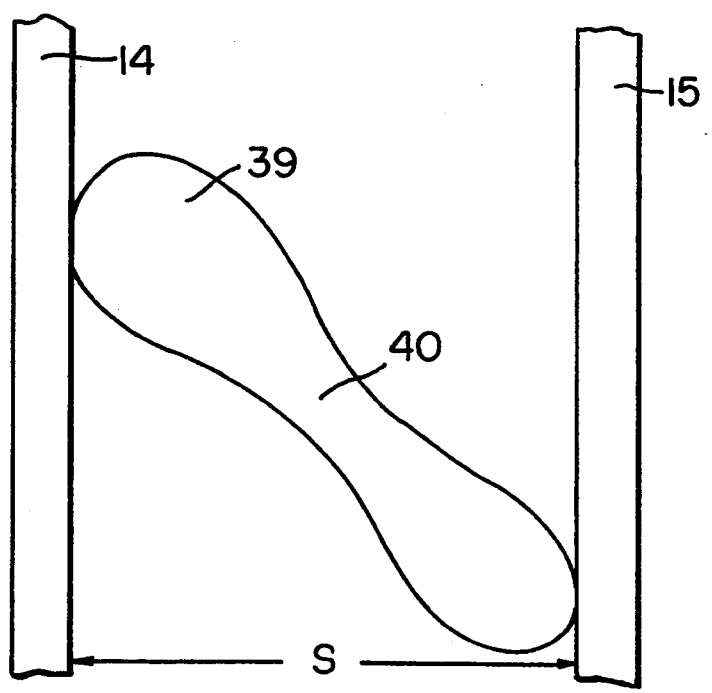
FIG. 8 is a view showing a pitch control device with a rotatably driven eccentric cam drive.

FIG. 8 illustrates another embodiment for the adjustment of the spacing S between the control rails 14 and 15. A cam member 39 is rotatable about its axis 40 by a drive member, not shown. Counterclock rotation of the cam member 39 will increase the spacing S. Clockwise rotation of the cam member 39 will decrease the spacing S. The control rails 14 and 15 are sufficiently flexible for this purpose.

Referring again to FIG. 3, the gripper sections 18 of each tentering clamp are preferably secured to the respective clamp body 2A in a removable manner. A dovetail connection 18A has been found suitable for this purpose.

Although the invention has been described with reference to specific example embodiments, it will be appreciated that it is intended to cover all modifications and equivalents within the scope of the appended claims.

What I claim is:

1. A tentering chain for treating a film web simultaneously in two axial directions, comprising a plurality of tentering clamps (1) for holding a film web, chain link plates interconnecting said tentering clamps to form said tentering chain with a continuously adjustable pitch between neighboring tentering clamps, each tentering clamp (1) comprising a throughgoing single shaft (7), at least two chain link plates (9, 10) secured to said single shaft (7), so that said single shaft (7) functions as a chain link pin, at least one (10) of said two chain link plates comprising an angled adjustment lever (11) having a first free end and a second end, a first adjustment roller (12) rotatably mounted to said free end of said adjustment lever for rolling along a first control rail (15), a second adjustment roller (13) arranged at said second end of said at least one (10) adjustment lever for rolling along a second control rail (14), a chain link pin (27) to which said second adjustment roller (13) is rotatably secured, said chain link pin interconnecting said at least two chain link plates (9, 10), and a chain link (8) including two bushings (8A, 8B), said chain link pin (27) also passing through one of said bushings while said single shaft (7) passes through the other of said two bushings.

2. The tentering chain of claim 1, wherein each tentering clamp comprises a clamp body including a first portion (2A) having a through-bore through which said single shaft extends and two second portions forming leg sections (2B, 2C) extending away from said first portion (2A), whereby said clamp body has an approximately C-shaped sectional configuration, and a clamp guide and support mechanism positioned between and secured to said two leg sections, said clamp guide and support mechanism comprising a plurality of vertical shafts secured to said leg sections, a plurality of guide rollers (5, 5A, 5B) rotatably mounted to said vertical shafts for guiding said clamp body along a guide rail (4), at least one horizontal shaft mounted (at 26) to one of said leg sections, and a support roller (6) rotatably secured to said horizontal shaft for supporting said clamp body on said guide rail (4).

3. The tentering chain of claim 1, wherein each tentering clamp comprises a clamp body with a through-bore through which said single shaft extends, a clamp guide and support mechanism secured to said clamp body, and a gripping section (18) secured to said clamp body.

4. The tentering chain of claim 3, comprising an attachment device (18A) for removably attaching said gripping section (18) to said clamp body (2A).

5. A tentering frame for treating a film web simultaneously in two axial directions comprising two tentering chains, a plurality of tentering clamps for holding a film web carried by each of said tentering chains, guide rails for guiding and supporting said tentering chains, and control rails for adjusting a pitch between neighboring tentering clamps, chain link plates interconnecting said tentering clamps to form said tentering chains, each tentering clamp (1) comprising a through-hole and a single shaft (7) passing through said through-hole, at least two chain link plates (9, 10) secured to said single shaft (7), so that said single shaft (7) functions as a chain link pin, at least one (10) of said two chain link plates comprising an angled adjustment lever (11) having a first free end and a second end, a first adjustment roller (12) rotatably mounted to said free end of said adjustment lever for rolling along a first control rail (15) of said control rails, a second adjustment roller (13) arranged at said second end of said at least one (10) adjustment lever for rolling along a second control rail (14) of said control rails, a chain link pin (27) to which said second adjustment roller (13) is rotatably secured, said chain link pin interconnecting said at least two chain link plates (9, 10), and a chain link (8) including two bushings (8A, 8B), said chain link pin (27) also passing through one of said bushings while said single shaft (7) passes through the other of said two bushings, a guide and support mechanism for supporting and guiding each tentering clamp by said guide rails, and drive means for adjusting said pitch.

6. The tentering frame of claim 5, wherein each tentering chain comprises a clamp body including a first portion (2A) having a through-bore through which said single shaft extends and two second portions forming leg sections (2B, 2C) extending away from said first portion (2A), whereby said clamp body has an approximately C-shaped sectional configuration, said clamp guide and support mechanism being positioned between and secured to said two leg sections, said clamp guide and support mechanism comprising a plurality of vertical shafts secured to said leg sections, a plurality of guide rollers (5, 5A, 5B) rotatably mounted to said vertical shafts for guiding said clamp body along said guide rail (4), at least one horizontal shaft mounted (at 26) to one of said leg sections, and a support roller (6) rotatably secured to said horizontal shaft for supporting said clamp body on said guide rail (4).

7. The tentering frame of claim 5, wherein said first and second control rails comprise an inner, position adjustable control rail (15) and an outer position adjustable control rail (14), said inner control rail being guided in said outer control rail, said second adjustment roller (13) rolling along said outer control rail.

8. The tentering frame of claim 7, wherein said drive means for adjusting said pitch are arranged to move said inner and outer control rails relative to each other for adjusting a spacing (S) between said inner and outer control rails (15, 14).

9. The tentering frame of claim 8, wherein said adjusting drive means comprise a driven spindle nut having a through-bore with a left-hand threading at one end of said through-bore and a right-hand threading at the opposite end of said through-bore, and two respectively threaded adjustment spindles threaded into said through-bore and connected to said inner and outer control rails for varying said spacing (S) when said spindle nut is rotated.

10. The tentering frame of claim 8, wherein said adjusting drive means comprise a rotatably drivable drive cam arranged to vary said spacing (S) between said inner and outer control rails.

11. The tentering frame of claim 10, wherein said drive cam comprises an eccentric cam.

12. The tentering frame of claim 8, wherein said adjusting drive means comprise at least one piston cylinder device for varying said spacing (S) between said inner and outer rails (14, 15).

* * * * *